United States Patent
Da Costa et al.

(10) Patent No.: US 10,359,851 B2
(45) Date of Patent: *Jul. 23, 2019

(54) ENHANCED DYNAMIC HAPTIC EFFECTS

(71) Applicant: Immersion Corporation, San Jose, CA (US)

(72) Inventors: Henry Da Costa, Montreal (CA); Eric Gervais, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,862

(22) Filed: Oct. 24, 2017

(65) Prior Publication Data
US 2018/0046252 A1 Feb. 15, 2018

Related U.S. Application Data

(63) Continuation of application No. 13/709,157, filed on Dec. 10, 2012, now Pat. No. 9,898,084.

(51) Int. Cl.
*G06F 3/01* (2006.01)

(52) U.S. Cl.
CPC ............. *G06F 3/016* (2013.01); *Y02T 10/82* (2013.01)

(58) Field of Classification Search
CPC .................... G06F 3/016; Y02T 10/82
See application file for complete search history.

(56) References Cited

U.S. PATENT DOCUMENTS

| | | | |
|---|---|---|---|
| 5,619,628 A * | 4/1997 | Fujita | G06T 13/20 345/419 |
| 5,692,117 A | 11/1997 | Berend et al. | |
| 5,774,386 A | 6/1998 | Pawle | |
| 6,108,011 A | 8/2000 | Fowler | |
| 6,337,678 B1 * | 1/2002 | Fish | G06F 3/011 345/156 |
| 6,449,019 B1 * | 9/2002 | Fincher | G06T 3/00 345/473 |
| 7,594,180 B1 | 9/2009 | Langmacher et al. | |
| 7,765,333 B2 * | 7/2010 | Cruz-Hernandez | G06F 3/016 710/5 |
| 7,919,945 B2 | 4/2011 | Houston et al. | |
| 8,035,535 B2 | 10/2011 | Nousiainen | |

(Continued)

FOREIGN PATENT DOCUMENTS

| CN | 101027631 A | 8/2007 |
|---|---|---|
| EP | 2325723 A2 | 5/2011 |

(Continued)

OTHER PUBLICATIONS

Any information that are not included with this Information Disclosure Statement can be found in U.S. Appl. No. 13/709,157.

*Primary Examiner* — Mihir K Rayan

(74) *Attorney, Agent, or Firm* — Miles & Stockbridge P.C.

(57) ABSTRACT

A system is provided that generates a dynamic haptic effect that includes one or more key frames, where each key frame includes a first interpolant value and a first haptic effect. The system further receives an interpolant value, where the interpolant value is between at least two interpolant values of at least two key frames. The system further determines the dynamic haptic effect from the interpolant value. The system further distributes the dynamic haptic effect among a plurality of actuators.

20 Claims, 11 Drawing Sheets

(56) References Cited

U.S. PATENT DOCUMENTS

| | | |
|---|---|---|
| 8,085,170 B2 | 12/2011 | Li |
| 8,179,378 B2 | 5/2012 | Aono |
| 8,279,193 B1 | 10/2012 | Birnbaum et al. |
| 8,451,238 B2 | 5/2013 | Kim et al. |
| 8,538,459 B2 | 9/2013 | Choi et al. |
| 8,542,185 B2 | 9/2013 | Jung et al. |
| 8,570,162 B2 | 10/2013 | Ujii et al. |
| 8,619,044 B2 | 12/2013 | Pertuit et al. |
| 8,736,559 B2 | 5/2014 | Penult et al. |
| 8,947,216 B2 * | 2/2015 | Da Costa ............... G08B 6/00 340/407.1 |
| 9,030,428 B2 | 5/2015 | Fleming |
| 9,092,057 B2 | 7/2015 | Varela et al. |
| 9,122,311 B2 | 9/2015 | Galor |
| 9,367,136 B2 | 6/2016 | Latta et al. |
| 9,370,459 B2 | 6/2016 | Mahoney |
| 9,370,704 B2 | 6/2016 | Marty |
| 9,392,094 B2 | 7/2016 | Hunt et al. |
| 9,417,695 B2 | 8/2016 | Griffin et al. |
| 9,462,262 B1 | 10/2016 | Worley, III et al. |
| 9,626,805 B2 | 4/2017 | Lampotang et al. |
| 9,645,646 B2 | 5/2017 | Cowley et al. |
| 9,652,037 B2 | 5/2017 | Rubin et al. |
| 9,760,166 B2 | 9/2017 | Ammi et al. |
| 9,811,854 B2 | 11/2017 | Lucido |
| 9,851,799 B2 | 12/2017 | Keller et al. |
| 9,898,084 B2 * | 2/2018 | Da Costa ............... G06F 3/016 |
| 9,933,851 B2 | 4/2018 | Goslin et al. |
| 9,948,885 B2 | 4/2018 | Kurzweil |
| 10,248,298 B2 | 4/2019 | Birnbaum et al. |
| 2002/0149561 A1 | 10/2002 | Fukumoto et al. |
| 2002/0163498 A1 | 11/2002 | Chang et al. |
| 2005/0124412 A1 | 6/2005 | Son et al. |
| 2006/0066588 A1 | 3/2006 | Lyon et al. |
| 2008/0198139 A1 | 8/2008 | Lacroix et al. |
| 2008/0204266 A1 | 8/2008 | Malmberg et al. |
| 2008/0223627 A1 | 9/2008 | Lacroix et al. |
| 2008/0294984 A1 | 11/2008 | Ramsay et al. |
| 2009/0128306 A1 | 5/2009 | Luden et al. |
| 2009/0195538 A1 | 8/2009 | Ryu et al. |
| 2009/0231271 A1 | 9/2009 | Heubel et al. |
| 2009/0303175 A1 | 12/2009 | Koivunen |
| 2010/0066512 A1 | 3/2010 | Rank |
| 2010/0148945 A1 | 6/2010 | Yun et al. |
| 2010/0156818 A1 | 6/2010 | Burrough et al. |
| 2010/0225456 A1 | 9/2010 | Eldering |
| 2010/0231508 A1 * | 9/2010 | Cruz-Hernandez ...... G06F 3/016 345/156 |
| 2010/0238116 A1 * | 9/2010 | Shin ........................ G06F 3/016 345/168 |
| 2010/0287311 A1 | 11/2010 | Cruz-Hernandez et al. |
| 2011/0115734 A1 | 5/2011 | Harashima et al. |
| 2011/0248916 A1 * | 10/2011 | Griffin .................... G06F 3/016 345/157 |
| 2011/0279380 A1 | 11/2011 | Weber et al. |
| 2012/0081337 A1 | 4/2012 | Camp, Jr. et al. |
| 2012/0126962 A1 | 5/2012 | Ujii et al. |
| 2012/0299859 A1 | 11/2012 | Kinoshita |
| 2012/0306903 A1 | 12/2012 | Griffin |
| 2013/0016053 A1 | 1/2013 | Jung |
| 2013/0207904 A1 | 8/2013 | Short et al. |
| 2013/0335209 A1 * | 12/2013 | Cruz-Hernandez ...... G06F 3/016 340/407.1 |
| 2014/0015761 A1 | 1/2014 | Fleming |
| 2014/0160034 A1 | 6/2014 | Da Costa et al. |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

FOREIGN PATENT DOCUMENTS

| | | |
|---|---|---|
| JP | 2002149312 A | 5/2002 |
| JP | 2004-310518 A | 11/2004 |
| JP | 2005332063 A | 12/2005 |
| JP | 2006058973 A | 3/2006 |
| JP | 2006146259 A | 6/2006 |
| JP | 2006198473 A | 8/2006 |
| JP | 2008-123429 A | 5/2008 |
| JP | 2008257295 A | 10/2008 |
| JP | 2008-546534 A | 12/2008 |
| JP | 2009181261 | 8/2009 |
| JP | 2009183751 | 8/2009 |
| JP | 2010015514 | 1/2010 |
| JP | 2010278727 | 12/2010 |
| JP | 2011129091 A | 6/2011 |
| JP | 2011154559 A | 8/2011 |
| JP | 2011159110 A | 8/2011 |
| JP | 2012-80533 A | 4/2012 |
| JP | 2012137888 A | 7/2012 |
| WO | 2002027705 | 4/2002 |
| WO | 2006019389 A2 | 2/2006 |
| WO | 2012063165 A1 | 5/2012 |
| WO | 2012109443 | 8/2012 |
| WO | 2013186847 A1 | 12/2013 |

\* cited by examiner

ENHANCED DYNAMIC HAPTIC EFFECTS

CROSS-REFERENCE TO RELATED APPLICATIONS

This application is a continuation of U.S. patent application Ser. No. 13/709,157 filed on Dec. 10, 2012, the specification of which is hereby incorporated by reference.

FIELD

One embodiment is directed generally to haptic effects, and more particularly, to generating dynamic haptic effects.

BACKGROUND

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, referred to as "handheld devices" or "portable devices," such as cellular telephones, personal digital assistants ("PDA's"), smartphones, and portable gaming devices. For example, some portable gaming applications are capable of vibrating in a manner similar to control devices (e.g., joysticks, etc.) used with larger-scale gaming systems that are configured to provide haptic feedback. Additionally, devices such as cellular telephones and smartphones are capable of providing various alerts to users by way of vibrations. For example, a cellular telephone can alert a user to an incoming telephone call by vibrating. Similarly, a smartphone can alert a user to a scheduled calendar item or provide a user with a reminder for a "to do" list item or calendar appointment. Further, haptic effects can be used to simulate "real world" dynamic events, such as the feel of a bouncing ball in a video game.

SUMMARY

One embodiment is a system that generates a dynamic haptic effect. The system receives a first key frame including a first interpolant value and a first haptic effect. The system further receives a second key frame including a second interpolant value and a second haptic effect. The system further receives an interpolant value, where the interpolant value is between the first interpolant value and the second interpolant value (or equal to either the first interpolant value or the second interpolant value). The system further determines the dynamic haptic effect from the interpolant value, the first key frame, and the second key frame. The system further distributes the dynamic haptic effect among a plurality of actuators.

Another embodiment is a system that generates the dynamic haptic effect. The system receives a plurality of key frames, where each key frame includes a key frame interpolant value, a haptic effect, and a direction value. The system further receives an interpolant value, where the interpolant value is between at least two key frame interpolant values (or equal to one of the at least two key frame interpolant values). The system further determines a direction for the dynamic haptic effect. The system further selects one or more key frames from the plurality of key frames, where each selected key frame includes a direction value that is equal to the direction. The system further determines the dynamic haptic effect from the interpolant value and the direction, where the determining includes interpolating the dynamic haptic effect from at least two haptic effects of at least two selected key frames.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
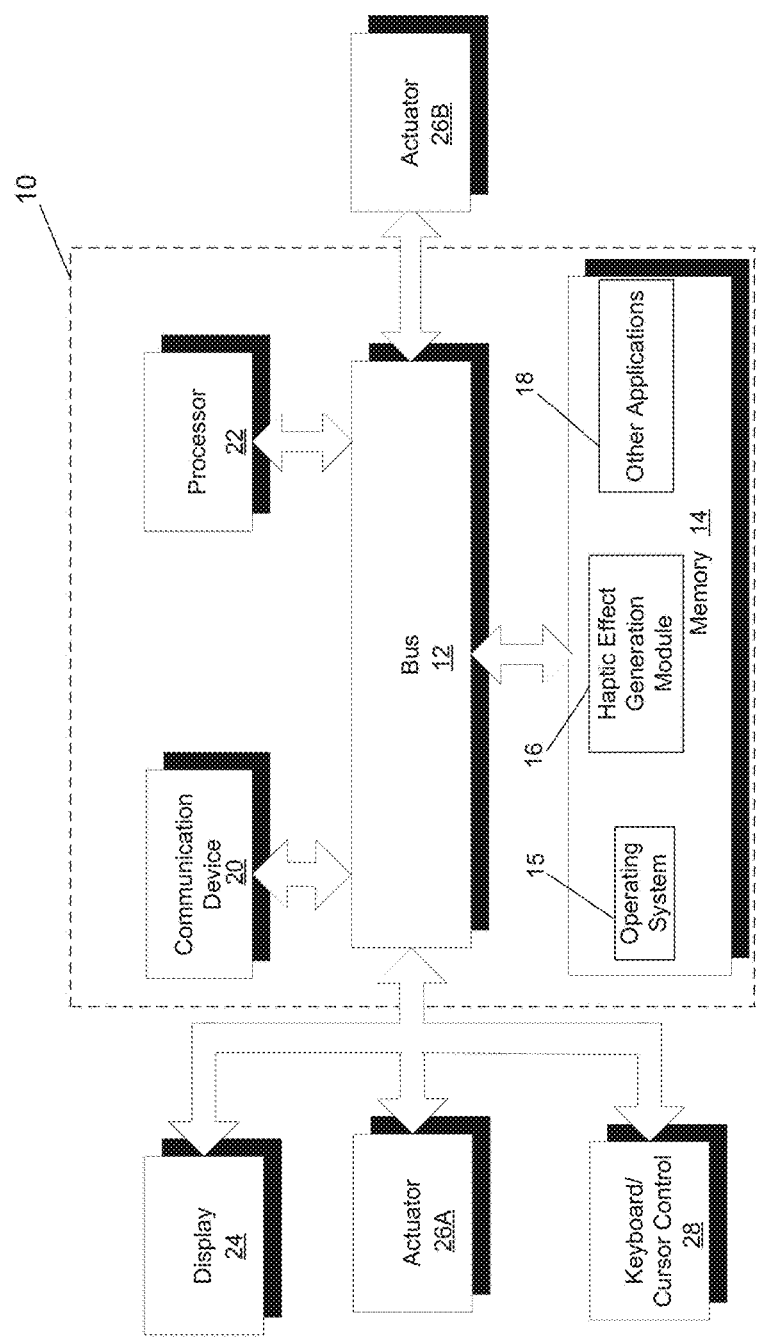
FIG. 1 illustrates a block diagram of a system in accordance with one embodiment of the invention.

As described below, a "dynamic haptic effect" refers to a haptic effect that evolves over time as it responds to one or more input parameters. Dynamic haptic effects are haptic or vibrotactile effects displayed on haptic devices to represent a change in state of a given input signal. The input signal can be a signal captured by sensors on the device with haptic feedback, such as position, acceleration, pressure, orientation, or proximity, or signals captured by other devices and sent to the haptic device to influence the generation of the haptic effect.

A dynamic effect signal can be any type of signal, but does not necessarily have to be complex. For example, a dynamic effect signal may be a simple sine wave that has some property such as phase, frequency, or amplitude that is changing over time or reacting in real time according to a mapping schema which maps an input parameter onto a changing property of the effect signal. An input parameter may be any type of input capable of being provided by a device, and typically may be any type of signal such as a device sensor signal. A device sensor signal may be generated by any means, and typically may be generated by capturing a user gesture with a device. Dynamic effects may be very useful for gesture interfaces, but the use of gestures or sensors are not necessarily required to create a dynamic signal.

One common scenario that does not involve gestures directly is defining the dynamic haptic behavior of an animated widget. For example, when a user scrolls a list, it is not typically the haptification of the gesture that will feel most intuitive, but instead the motion of the widget in response to the gesture. In the scroll list example, gently sliding the list may generate a dynamic haptic feedback that changes according to the speed of the scrolling, but flinging the scroll bar may produce dynamic haptics even after the gesture has ended. This creates the illusion that the widget has some physical properties and it provides the user with information about the state of the widget such as its velocity or whether it is in motion.

A gesture is any movement of the body that conveys meaning or user intent. It will be recognized that simple gestures may be combined to form more complex gestures. For example, bringing a finger into contact with a touch sensitive surface may be referred to as a "finger on" gesture, while removing a finger from a touch sensitive surface may be referred to as a separate "finger off" gesture. If the time between the "finger on" and "finger off" gestures is relatively short, the combined gesture may be referred to as "tapping"; if the time between the "finger on" and "finger off" gestures is relatively long, the combined gesture may be referred to as "long tapping"; if the distance between the two dimensional (x,y) positions of the "finger on" and "finger off" gestures is relatively large, the combined gesture may be referred to as "swiping"; if the distance between the two dimensional (x,y) positions of the "finger on" and "finger off" gestures is relatively small, the combined gesture may be referred to as "smearing", "smudging" or "flicking". Any number of two dimensional or three dimensional simple or complex gestures may be combined in any manner to form any number of other gestures, including, but not limited to, multiple finger contacts, palm or first contact, or proximity to the device. A gesture can also be any form of hand movement recognized by a device having an accelerometer, gyroscope, or other motion sensor, and converted to electronic signals. Such electronic signals can activate a dynamic effect, such as shaking virtual dice, where the sensor captures the user intent that generates a dynamic effect.

One embodiment is a system that can generate one or more dynamic haptic effects at a plurality of actuators, where the one or more dynamic haptic effects can be distributed among the plurality of actuators. The system can define two or more key frames for a dynamic haptic effect. In one embodiment, the system can allow each key frame to target a specific actuator of the plurality of actuators using an actuator value, interpolate the separate actuator values, generate the dynamic haptic effect by interpolating two or more haptic effects stored within two or more key frames, and then distribute the dynamic haptic effect among the targeted actuators based on the interpolated actuator value. In another embodiment, the system can allow each key frame to target a specific actuator of the plurality of actuators, group together the key frames that target the same actuator, and generate the dynamic haptic effect by independently interpolating the haptic effects stored within the grouped key frames for each actuator. In another embodiment, the system can determine actuator distribution information that indicates how to distribute the dynamic haptic effect among a plurality of actuators. The system can then generate the dynamic haptic effect by interpolating two or more haptic effects stored within two or more key frames, and then distribute the dynamic haptic effect among the plurality of actuators using the actuator distribution information.

Another embodiment is a system that can generate a dynamic haptic effect using one or more key frames, where each key frame includes a direction property. The direction property can indicate that the key frame is to be used for a specific direction of a dynamic haptic effect. Based on a determined direction of the dynamic haptic effect, one or more key frames with a direction property that is equal to the determined direction can be used to generate the dynamic haptic effect.

One type of a dynamic haptic effect is a haptic effect that can be generated by interpolating a first haptic effect and a second haptic effect based on a dynamic value that is a value between a first interpolant value and a second interpolant value. A dynamic value that is equal to either the first interpolant value or the second interpolant value is considered "between the first interpolant value and the second interpolant value." More specifically, a value for each parameter of the dynamic haptic effect is calculated by interpolating a value of the parameter of the first haptic effect with a value of the parameter of the second haptic effect, using an interpolation function. The interpolation of each parameter value of the dynamic haptic effect can be based upon where the dynamic value falls between the first interpolant value and the second interpolant value. Dynamic haptic effects are further described in U.S. patent application Ser. No. 13/546,351, filed on Jul. 11, 2012, entitled "GENERATING HAPTIC EFFECTS FOR DYNAMIC EVENTS" (the contents of which are herein incorporated by reference), and in U.S. patent application Ser. No. 13/667,003, filed on Nov. 2, 2012, entitled "ENCODING DYNAMIC HAPTIC EFFECTS" (the contents of which are herein incorporated by reference). The dynamic haptic effect can be encoded using a haptic effect signal, where the haptic effect signal is a representation of the dynamic haptic effect. The haptic effect signal can be persisted on a disk, memory, or any computer-readable storage medium. In the aforementioned embodiments, the two or more key frames associated with a dynamic haptic effect can comprise the one or more input parameters of a dynamic haptic effect produced by a haptic effect signal.

FIG. 1 illustrates a block diagram of a system 10 in accordance with one embodiment of the invention. In one embodiment, system 10 is part of a device, and system 10 provides a haptic effect generation functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic effect generation module 16 that generates a dynamic haptic effect, as disclosed in more detail below. In certain embodiments, haptic effect generation module 16 can comprise a plurality of modules, where each individual module provides specific individual functionality for generating a dynamic haptic effect. System 10 will typically include one or more additional application modules 18 to include additional functionality, such as the Integrator™ application by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touchscreen, configured to send and receive signals from processor 22, and may be a multi-touch touchscreen. Processor 22 may be further coupled to a keyboard or cursor control 28 that allows a user to interact with system 10, such as a mouse or a stylus.

System 10, in one embodiment, further includes an actuator 26A. Processor 22 may transmit a haptic signal associated with a generated haptic effect to actuator 26A, which in turn outputs haptic effects such as vibrotactile haptic effects. Actuator 26A includes an actuator drive circuit. Actuator 26A may be, for example, an electric motor, an electromagnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26A. In the illustrated embodiment, system 10 includes actuator 26B, in addition to actuator 26A. However, this is only an example embodiment, and in other embodiments, system 10 can include additional actuators not illustrated in FIG. 1, or can only include actuator 26A. In other embodiments, a separate device from system 10 includes an actuator that generates the haptic effects, and system 10 sends generated haptic effect signals to that device through communication device 20. Actuators 26A and 26B are examples of a haptic output device, where a haptic output device is a device configured to output haptic effects, such as vibrotactile haptic effects, in response to a drive signal.

Figure 2:
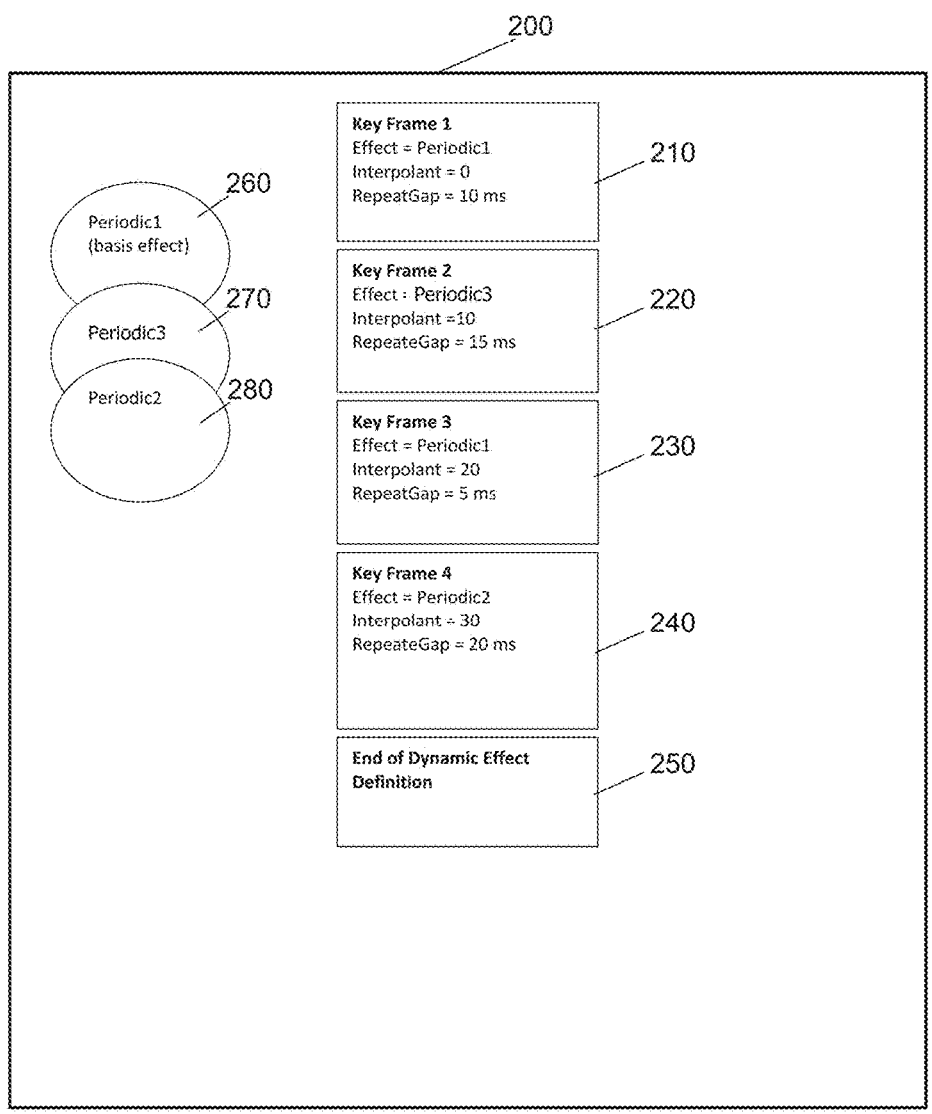
FIG. 2 illustrates an example dynamic haptic effect definition, according to an embodiment of the invention.

FIG. 2 illustrates an example dynamic haptic effect definition 200, according to an embodiment of the invention. According to an embodiment, a dynamic haptic effect can be defined to include one or more key frames. A key frame is a representation of a basis haptic effect that can be used to define the dynamic haptic effect. Also according to an embodiment, a haptic effect signal can be generated using the one or more key frames, where the haptic effect signal is a signal that can store one or more key frames. By generating the haptic effect signal using the one or more key frames, the one or more key frames are generated, and subsequently stored within the haptic effect signal. The haptic effect signal can be stored within, and retrieved from, a haptic effect file.

A key frame can include a basis haptic effect definition. A basis haptic effect is a haptic effect that can include one or more parameters that define the characteristics of the haptic effect (more specifically, the characteristics of the kinesthetic feedback and/or tactile feedback produced by the haptic effect), where the haptic effect can be a vibratory haptic effect, for example. Examples of the one or more parameters can include a magnitude parameter, a frequency parameter, a period parameter, and a duration parameter. Examples of basis haptic effects can include a "MagSweep haptic effect", and a "periodic haptic effect." A MagSweep haptic effect is a haptic effect that produces kinesthetic feedback and/or tactile feedback (such as a vibration). A periodic haptic effect is a haptic effect that produces a repeating kinesthetic feedback and/or tactile feedback (such as a vibration pattern). An example of a repeating pattern includes repeating pulses of certain shapes, such as sinusoidal, rectangular, triangular, sawtooth-up and sawtooth-down.

A key frame can include an interpolant value. An interpolant value is a value that specifies where a current interpolation is occurring. In an embodiment, an interpolant value can be an integer value from a minimum value to a maximum value. As an example, an interpolant value can be from 0 to 10,000. In other embodiments, an interpolant value can be a fixed-point or floating-point numeric value. An interpolant value can be stored within one or more bits.

A key frame can optionally also include a repeat gap value. A repeat gap value is a value that indicates a time period between two consecutive instances of a basis haptic effect when the basis haptic effect is played consecutively. In one embodiment, a repeat gap can indicate a number of milliseconds between two consecutive instances of the basis haptic effect.

In the illustrated embodiment, dynamic haptic effect definition 200 includes four key frames, key frames 210, 220, 230, and 240. However, this is merely an example embodiment, and in alternate embodiments, a dynamic haptic effect definition can include any number of key frames. Key frame 210 includes a basis haptic effect reference of "Periodic1," an interpolant value of "0," and a repeat gap value of "10 ms". The basis haptic effect reference "Periodic1" refers to basis haptic effect 260, which is also included within dynamic haptic effect definition 200. Thus, key frame 210 defines basis haptic effect 260 as the basis haptic effect for the interpolant value of "0." Key frame 210 further indicates that when basis haptic effect 260 is played consecutively, there is a time period of 10 ms between each consecutive instance of basis haptic effect 260. Similarly, key frame 220 includes a basis haptic effect reference of "Periodic3," an interpolant value of "10," and a repeat gap value of "15 ms". The basis haptic effect reference "Periodic3" refers to basis haptic effect 270, which is also included within dynamic haptic effect definition 200. Thus, key frame 220 defines basis haptic effect 270 as the basis haptic effect for the interpolant value of "10." Key frame 220 further indicates that when basis haptic effect 270 is played consecutively, there is a time period of 15 ms between each consecutive instance of basis haptic effect 270.

Likewise, key frame 230 includes a basis haptic effect reference of "Periodic1," an interpolant value of "20," and a repeat gap value of "5 ms". As previously described, the basis haptic effect reference "Periodic1" refers to basis haptic effect 260, which is also included within dynamic haptic effect definition 200. Thus, key frame 230 defines basis haptic effect 260 as the basis haptic effect for the interpolant value of "20." This illustrates that a basis haptic effect can be defined as a basis haptic effect for more than one interpolant value. Key frame 230 further indicates that when basis haptic effect 260 is played consecutively, there is a time period of 5 ms between each consecutive instance of basis haptic effect 260. Similarly, key frame 240 includes a basis haptic effect reference of "Periodic2," an interpolant value of "30," and a repeat gap value of "20 ms". The basis haptic effect reference "Periodic2" refers to basis haptic effect 280, which is also included within dynamic haptic effect definition 200. Thus, key frame 240 defines basis haptic effect 280 as the basis haptic effect for the interpolant value of "30." Key frame 240 further indicates that when basis haptic effect 280 is played consecutively, there is a time period of 20 ms between each consecutive instance of basis haptic effect 280.

According to an embodiment, a dynamic haptic effect can be defined to also include an indication of an end of the dynamic haptic effect. The indication of the end of the dynamic haptic effect indicates that the dynamic haptic effect does not include any additional key frames. As described below in greater detail, a device that interprets a dynamic haptic effect definition can be configured to interpret the contents of the dynamic haptic effect definition sequentially. Thus, the indication can indicate to a device the end of the dynamic haptic effect definition. In one embodiment, the indication of an end of the dynamic haptic effect can be considered an additional key frame. In the illustrated embodiment, dynamic haptic effect definition 200 includes end of dynamic haptic effect definition 250 which indicates the end of dynamic haptic effect definition 200.

Figure 3:
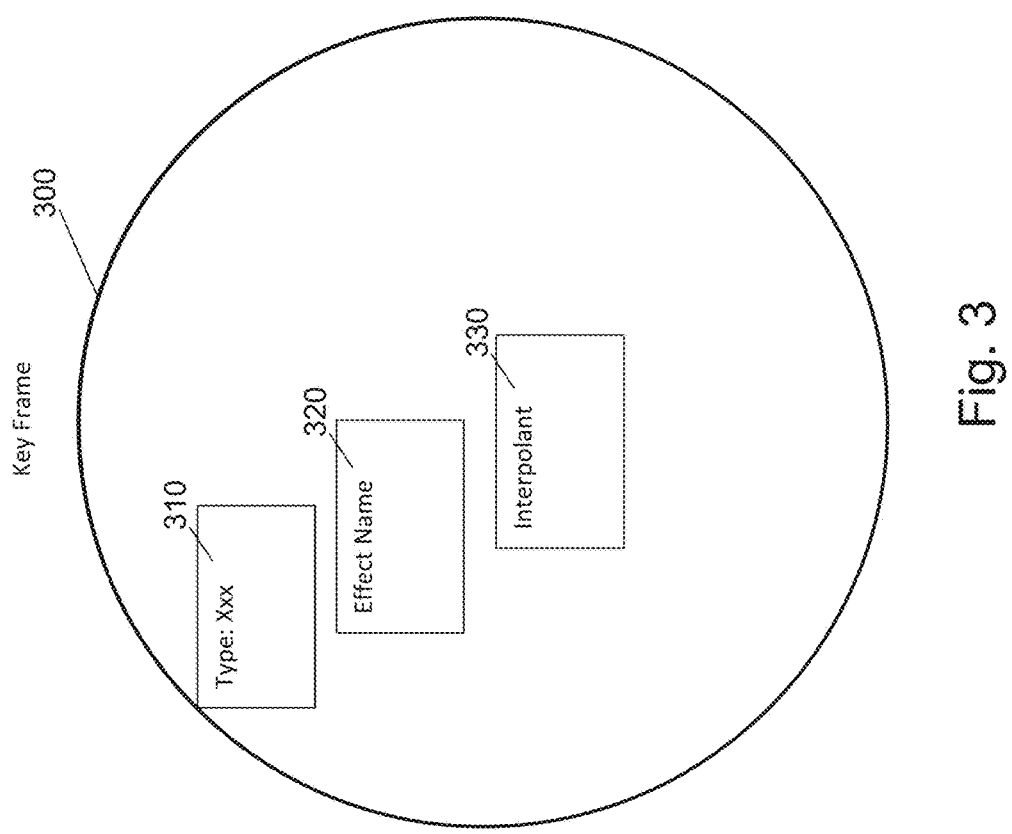
FIG. 3 illustrates an example key frame definition, according to an embodiment of the invention.

FIG. 3 illustrates an example key frame definition 300, according to an embodiment of the invention. As previously described, a dynamic haptic effect definition includes one or more key frames. According to the embodiment, a key frame definition can include one or more properties. Each property of the one or more properties can include a value.

A key frame definition can include a type property. In one embodiment, the type property is the first property of the key frame definition. The type property can indicate whether the key frame is a key frame that contains a basis haptic effect for a dynamic haptic effect definition or a key frame that indicates an end of the dynamic haptic effect definition. In the illustrated embodiment, key frame definition 300 includes type property 310 which indicates the type of key frame defined by key frame definition 300.

A key frame definition can also include a basis haptic effect property. The basis haptic effect property can store a reference to a basis haptic effect for the key frame. In the illustrated embodiment, key frame definition 300 includes basis haptic effect property 320 (identified in FIG. 3 as "effect name") which includes a reference to a basis haptic effect for the key frame defined by key frame definition 300.

A key frame definition can also include an interpolant property. The interpolant property can store an interpolant value, where the interpolant value specifies where a current interpolation is occurring. In an embodiment, an interpolant value can be an integer value from a minimum value to a maximum value. As an example, an interpolant value can be from 0 to 10,000. The interpolant value can be stored in one or more bits. In the illustrated embodiment, key frame definition 300 includes interpolant property 330 which includes an interpolant value for the key frame defined by key frame definition 300.

A key frame definition can also optionally include a repeat gap property (not illustrated in FIG. 3). The repeat gap property can store a repeat gap value which indicates a time period between two consecutive instances of a basis haptic effect for a key frame when the basis haptic effect is played consecutively. In one embodiment, a repeat gap can indicate a number of milliseconds between two consecutive instances of the basis haptic effect for the key frame.

In one embodiment, a haptic effect file is a computer file configured to store one or more dynamic haptic effects, where the haptic effect file can be persisted on a disk, memory, or any computer-readable storage medium. According to the embodiment, a haptic effect file can store one or more dynamic haptic effect definitions using a basis haptic effect storage block and a frame list block. A basis haptic effect storage block can be used to store one or more basis haptic effects that a dynamic haptic effect can reference. A frame list block can be used to store one or more key frame definitions that correspond to a dynamic haptic effect definition. A basis haptic effect storage block and a frame list block are now described in greater detail.

Figure 4:
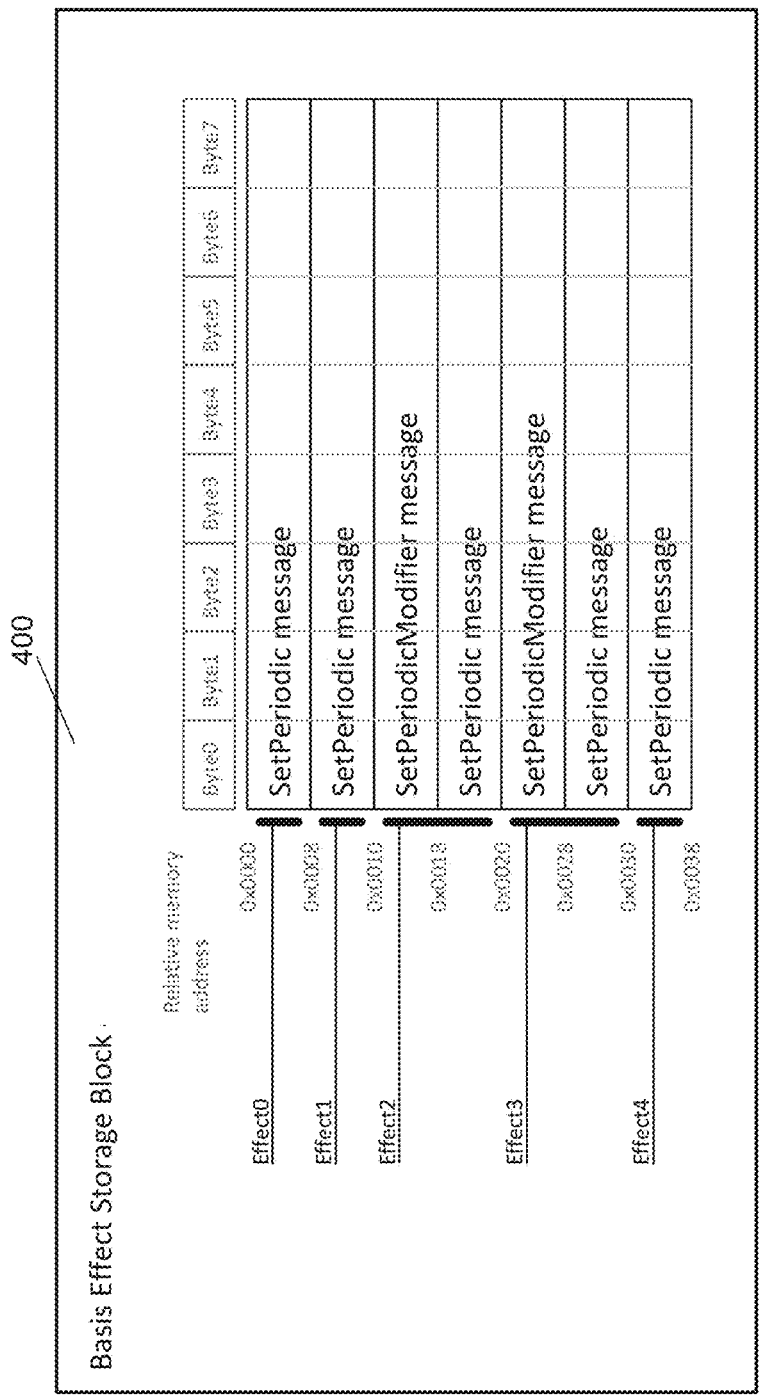
FIG. 4 illustrates an example basis haptic effect storage block, according to an embodiment of the invention.

FIG. 4 illustrates an example basis haptic effect storage block 400, according to an embodiment of the invention. As previously described, a dynamic haptic effect definition can include one or more basis haptic effects, where at least one stored basis haptic effect is referenced by at least one key frame of the dynamic haptic definition. In one embodiment, the one or more basis haptic effects can be stored within a basis haptic effect storage block, such as basis haptic effect storage block 400, where the basis haptic effect storage block is stored within the dynamic haptic effect definition.

According to the embodiment, one or more basis haptic effects can be stored as message streams within basis haptic effect storage block 400. An example messaging format is a "codename z2" protocol messaging format. In the illustrated embodiment, a basic haptic effect is defined by a SetPeriodic message optionally preceded by a SetPeriodicModifier message. Thus, when a basis haptic effect has an associated envelope, a SetPeriodicModifier message can appear before a SetPeriodic message in the block. Otherwise, only a SetPeriodic message can appear in the block. Thus, according to the embodiment, a basis haptic effect, as stored in a basis haptic effect storage block (such as basis haptic effect storage block 400 of FIG. 4) can either take up: (a) 8 bytes of memory in a single SetPeriodic message (assuming a default envelope); or (b) 16 bytes of memory in a first SetPeriodicModifier message followed by a subsequent SetPeriodic message.

According to the embodiment, a basis haptic effect storage block (such as basis haptic effect storage block 400 of FIG. 4) can include one or more basis haptic effect definitions, where each basis haptic effect definition corresponds to a basis haptic effect. The one or more basis haptic effect definitions can be sequential within the basis haptic effect storage block, and can each be associated with an index.

In the illustrated embodiment, basis haptic effect storage block 400 includes five basis haptic effects: Effect0, Effect1, Effect2, Effect3, and Effect4. Effect0 is the first basis haptic effect located in basis haptic effect storage block 400, Effect1 is the second basis haptic effect located in basis haptic effect storage block 400, Effect2 is the third basis haptic effect located in basis haptic effect storage block 400, Effect3 is the fourth basis haptic effect located in basis haptic effect storage block 400, and Effect4 is the fifth basis haptic effect located in basis haptic effect storage block 400. Each of the five basis haptic effects (i.e., Effect0, Effect1, Effect2, Effect3, and Effect4) includes a basic haptic definition that either includes a single SetPeriodic message or a combination of a SetPeriodicModifier message and a SetPeriodic message.

Figure 5:
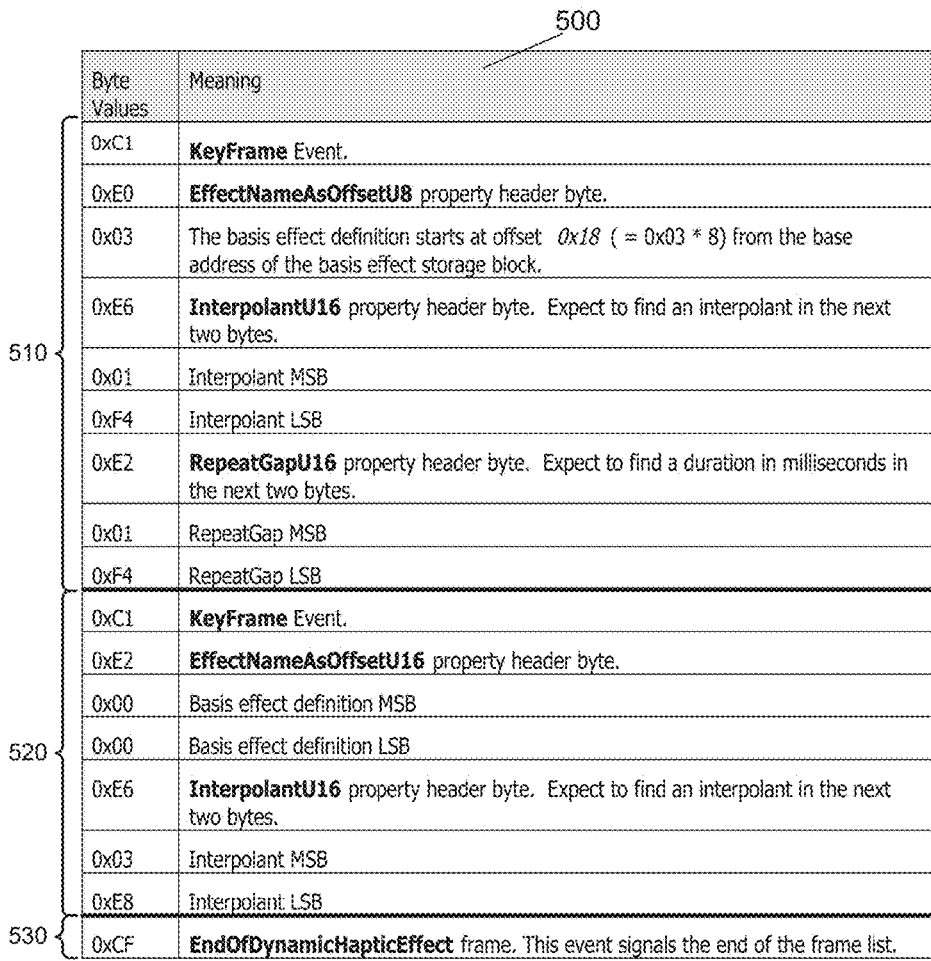
FIG. 5 illustrates an example frame list block, according to an embodiment of the invention.

FIG. 5 illustrates an example frame list block 500, according to an embodiment of the invention. As previously described, a dynamic haptic effect definition can include one or more key frames, where each key frame can reference a basis haptic effect. In one embodiment, the one or more key frames can be stored within a frame list block, such as frame list block 500, where the frame list block is stored within the dynamic haptic effect definition.

According to the embodiment, a frame list block, such as frame list block 500, includes a type property for a first key frame definition. Depending on the type property, the frame list block further includes one or more properties associated with the first key frame definition, such as a basis haptic effect property, an interpolant property, a repeat gap property, or a combination therein. The frame list block further includes a type property for a second key frame definition, which indicates the end of the first key frame definition. Depending on the type property, the frame list block further includes one or more properties associated with the second key frame definition, such as a basis haptic effect property, an interpolant property, a repeat gap property, or a combination therein. This continues for each key frame definition of the frame list block. The frame list block further includes a type property that indicates an end of a dynamic haptic effect. According to the embodiment, the key frame definitions of the frame list block are in sequential order. In other words, the events of the frame list block are processed in the order in which they are located within the frame list block.

According to the embodiment, one or more properties of the frame list block can be encoded using a single header byte, followed by optional data bytes. An example encoding scheme of one or more properties of a frame list block is as follows:

| | Key Frame Type Property | |
|---|---|---|
| Byte # | Bits7-0 | Meaning |
| 0 | 0xC1 | Type = Key Frame. No data associated with this property. |

| | End of Dynamic Haptic Effect Type Property | |
|---|---|---|
| Byte # | Bits7-0 | Meaning |
| 0 | 0xCF | Type = End of Dynamic Haptic Effect. No data associated with this property. |

| | EffectNameAsOffSetU8 Property | |
|---|---|---|
| Byte # | Bits7-0 | Meaning |
| 0 | 0xE0 | EffectName is specified as a memory offset from the base of the basis haptic effect storage block. |
| 1 | OFFSET11_3 | The offset from the basis of the basis haptic effect storage block where the 8 or 16-byte haptic effect definition can be found. The OFFSET11_3 value can be multiplied by 8 to obtain the actual address offset |

| | InterpolantU16 Property | |
|---|---|---|
| Byte # | Bits7-0 | Meaning |
| 0 | 0xE6 | Interpolant is stored as a 16-bit unsigned integer |
| 1 | TIME15_8 | The MSByte of the TimeOffset value |
| 2 | TIME7_0 | The LSByte of the TimeOffset value |

| | RepeatGapU16 Property | |
|---|---|---|
| Byte # | Bits7-0 | Meaning |
| 0 | 0xE2 | Repeat gap value is stored in an un-signed 16-bit value, in milliseconds |
| 1 | PERIOD15_8 | The MSByte of the value |
| 2 | PERIOD7_0 | The LSByte of the value |

According to the embodiment, the key frame type property and the end of dynamic haptic effect type property correspond to a type property of a key frame definition, the EffectNameAsOffSetU 8 property corresponds to a basis haptic effect property of the key frame definition, the InterpolantU 16 property corresponds to an interpolant property of the key frame definition, and the RepeatGapU 16 property corresponds to a repeat gap property of the key frame definition.

In the illustrated embodiment, frame list block 500 includes key frame definitions 510, 520, and 530. Key frame definitions 510 and 520 are each a definition for a basis haptic effect key frame. Key frame definition 530 is an indication of an end of the dynamic haptic effect stored within frame list block. The left column of frame list block 500 indicates a byte stream that is found in memory for each of key frame definitions 510, 520, and 530. The right column of frame list block indicates a meaning of each property for each of key frame definitions 510, 520, and 530.

According to the illustrated embodiment, key frame definition 510 includes a key frame type property ("KeyFrame Event" as illustrated in FIG. 5) that indicates a start of key frame definition 510. Key frame definition 510 further includes a basis haptic effect property ("EffectNameAsOffsetU 8 " as illustrated in FIG. 5) that stores a reference to a basis haptic effect for key frame definition 510, where the basis haptic effect property includes a header byte and an offset byte. Key frame definition 510 further includes an interpolant property ("InterpolantU 16 " as illustrated in FIG. 5) that stores an interpolant value specifying where a current interpolation is occurring, where the interpolant property includes a header byte, a most significant bit ("MSB"), and a least significant bit ("LSB"). Key frame definition 510 further includes a repeat gap property ("RepeatGapU 16 " as illustrated in FIG. 5) that stores a repeat gap value which indicates a time period between two consecutive instances of a basis haptic effect for a key frame, where the repeat gap property includes a header byte, an MSB, and an LSB.

Further, key frame definition 520 also includes a key frame type property ("KeyFrame Event" as illustrated in FIG. 5) that indicates a start of key frame definition 520. Key frame definition 520 further includes a basis haptic effect property ("EffectNameAsOffsetU 16" as illustrated in FIG. 5) that stores a reference to a basis haptic effect for key frame definition 520, where the basis haptic effect property includes a header byte, a basis haptic effect definition MSB, and a basis haptic effect definition LSB. Key frame definition 520 further includes an interpolant property ("InterpolantU 16 " as illustrated in FIG. 5) that stores an interpolant value specifying where a current interpolation is occurring, where the interpolant property includes a header byte, an MSB, and an LSB. As illustrated in FIG. 5, in contrast to key frame definition 510, key frame definition 520 does not include a repeat gap property. Finally, key frame definition 530 includes an end of dynamic haptic effect type property ("EndofDynamicHapticEffect" as illustrated in FIG. 5) that indicates an end of the dynamic haptic effect definition.

According to an embodiment, a dynamic haptic effect definition (such as dynamic haptic effect definition 200 of FIG. 2) can be stored within a haptic effect file. As previously described, a haptic effect file is a computer file configured to store one or more dynamic haptic effects. The dynamic haptic effect definition can be stored within the haptic effect file, and the haptic effect file can be persisted within a computer-readable medium, such as a disk or memory. The dynamic haptic effect definition can subsequently be retrieved from the haptic effect and interpreted. Based on the interpretation of the dynamic haptic effect definition, a dynamic haptic effect can be generated by interpolating a first haptic effect and a second haptic effect based on a dynamic value that is a value between a first interpolant value and a second interpolant value. More specifically, a value for each parameter of the dynamic haptic effect can be calculated by interpolating a value of the parameter of the first haptic effect with a value of the parameter of the second haptic effect, using an interpolation function. The interpolation of each parameter value of the dynamic haptic effect can be based upon where the dynamic value falls between the first interpolant value and the second interpolant value. For example, where a first interpolant value is "0" and a second interpolant value is "100," a dynamic value of "50" can cause a first haptic effect associated with the first interpolant value of "0" to be interpolated with a second haptic effect associated with the second interpolant value of "100" to create the dynamic haptic effect. Each parameter value of the first haptic effect can be interpolated with a parameter value of the second value based on an interpolation function, so that the parameter values of the dynamic haptic effect are based both on the parameter values of the first haptic effect and the parameter values of the second haptic effect. Also according to an embodiment, a dynamic haptic effect definition (such as dynamic haptic effect definition 200 of FIG. 2) can be used to generate a haptic effect signal, where the haptic effect signal can be stored within a haptic effect file. The haptic effect signal can subsequently be retrieved from the haptic effect file. Further, a drive signal can be applied to a haptic output device according to the haptic effect signal. The drive signal can be further generated using the haptic output device.

As previously described, a system can generate a dynamic haptic effect and distribute the haptic effect among a plurality of actuators. The generation and distribution of the dynamic haptic effect can be implemented using different techniques. Example implementations are described below.

Figure 6:
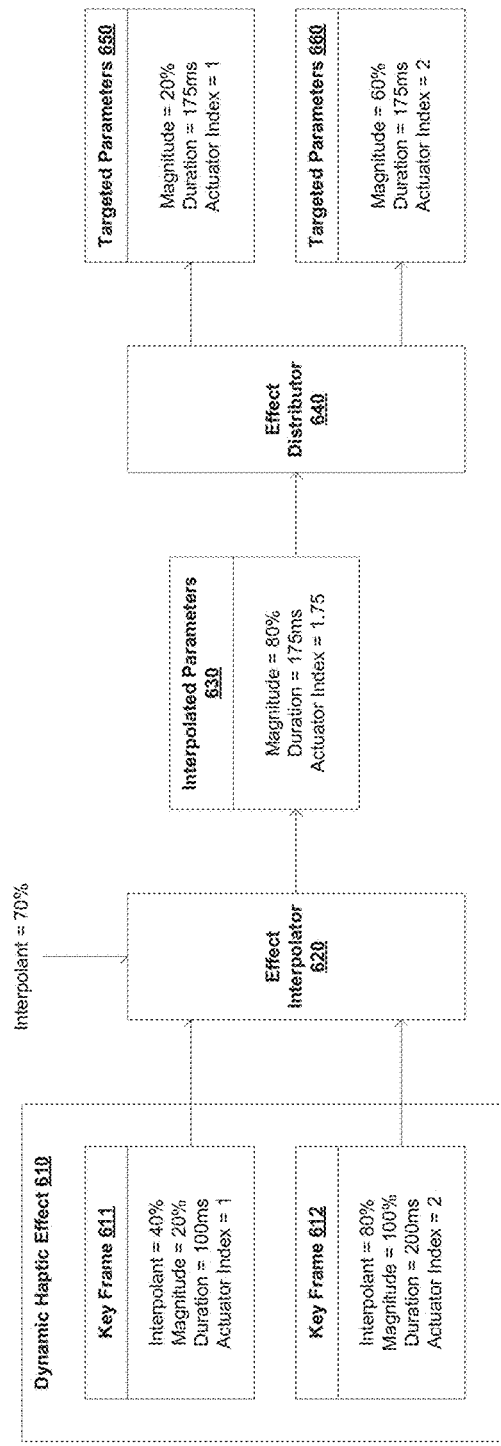
FIG. 6 illustrates a block diagram of an example implementation of generating a dynamic haptic effect at multiple actuators, according to an embodiment of the invention.

FIG. 6 illustrates a block diagram of an example implementation of generating a dynamic haptic effect at multiple actuators, according to an embodiment of the invention. According to the embodiment, a dynamic haptic effect can include one or more key frames, and each key frame can include an actuator value that identifies an actuator. The actuator identified by the actuator value is an actuator that the key frame targets. When a system interpolates each haptic effect stored in two or more key frames to generate the dynamic haptic effect, the system can also interpolate each actuator value stored in the two or more key frames to generate an interpolated actuator value. The system can then use the interpolated actuator value to distribute the generated dynamic haptic effect among two or actuators identified by the two or more actuator values.

For example, as illustrated in FIG. 6, dynamic haptic effect 610 includes key frames 611 and 612. Key frame 611 includes an interpolant value of "40%," a magnitude value of "20%," a duration value of "100 ms," and an actuator value (identified in FIG. 6 as an "actuator index") of "1." According to the embodiment, the magnitude value of "20%," and the duration value of "100 ms," collectively represents a basis haptic effect that is stored within key frame 611. Of course, the illustrated embodiment is only an example embodiment, and, in alternate embodiments, a basis haptic effect can include other parameters (such as a frequency parameter and a period parameter) that are stored within a key frame. Key frame 612 includes an interpolant value of "80%," a magnitude value of "100%," a duration value of "200 ms," and an actuator value of "2." According to the embodiment, the magnitude value of "100%," and the duration value of "200 ms," collectively represents a basis haptic effect that is stored within key frame 612.

According to the embodiment, the system can receive an interpolant value of "70%" at effect interpolator 620, and interpolate the basis haptic effect of key frame 611 (i.e., the magnitude value of "20%," and the duration value of "100 ms,") with the basis haptic effect of key frame 612 (i.e., the magnitude value of "100%," and the duration value of "200 ms"). The system can further interpolate the actuator value of key frame 611 (i.e., the actuator value "1") with the actuator value of key frame 612 (i.e., the actuator value "2"). The result of these two interpolations is interpolated parameters 630, where interpolated parameters 630 represent dynamic haptic effect 610.

According to the illustrated embodiment, interpolated parameters 630 include an interpolated magnitude value of "80%," an interpolated duration value of "175 ms," and an interpolated actuator value (identified in FIG. 6 as an "actuator index") of "1.75." According to the embodiment, the interpolated magnitude value of "80%," is interpolated from the two magnitude values of "20%" and "100%," based on an interpolation function. Further, the interpolated duration value of "175 ms" is interpolated from the two duration values of "100 ms" and "200 ms," also based on an interpolation function. Additionally, the interpolated actuator value of "1.75" is interpolated from the two actuator values of "1," and "2," also based on an interpolation function.

Further, according to the embodiment, at effect distributor 640, the system can distribute interpolated parameters 630, which represent dynamic haptic effect 610, among a plurality of actuators based on the interpolated actuator value, where the system generates targeted parameters for each actuator of the plurality of actuators based on the interpolated actuator value. The targeted parameters for each actuator represent a portion of dynamic haptic effect 610 that is distributed to the actuator. In the illustrated embodiment, at effect distributor 640, the system generates targeted parameters 650 and targeted parameters 660. Targeted parameters 650 include a magnitude value of "20%," a duration value of "175 ms," and an actuator value of "1." Targeted parameters 660 include a magnitude value of "60%," a duration value of "175 ms," and an actuator value of "2." According to the embodiment, the system can use the interpolated actuator value "1.75" of interpolated parameters 630 to distribute 25% of dynamic haptic effect 610 to actuator "1," and to distribute 75% of dynamic haptic effect 610 to actuator "2." In one embodiment, the strength parameters of dynamic haptic effect 610, such as a magnitude parameter and a period parameter, are distributed among the plurality of actuators. According to the embodiment, the time-based parameters, such as a frequency parameter and a duration parameter, remain the same for the plurality of actuators.

Thus, in the illustrated embodiment, the interpolated magnitude value "80%" of interpolated parameters 630 is distributed into a magnitude value of "20%" for targeted parameters 650, and a magnitude value of "60%" for targeted parameters 660. Further, in the illustrated embodiment, the duration value "175 ms" of interpolated parameters 630 is included in both targeted parameters 650 and targeted parameters 660. While the illustrated embodiment involves two key frames, where each key frame includes an actuator value, and thus, involves two actuators, one of ordinary skill in the art would readily appreciate that, in alternate embodiments, the above implementation can involve any number of key frames, where each key frame includes an actuator value, and thus, can include any number of actuators.

Thus, in another example, a first actuator can be on a left side of a device, and a second actuator can be on a right side of a device. A first key frame of a dynamic haptic effect can be played at the first actuator. A second key frame of a dynamic haptic effect can be played at the second actuator. As a system interpolates from the first key frame to the second key frame to generate the dynamic haptic effect, a user of the device can feel the dynamic haptic effect move from the left actuator to the right actuator.

Figure 7:
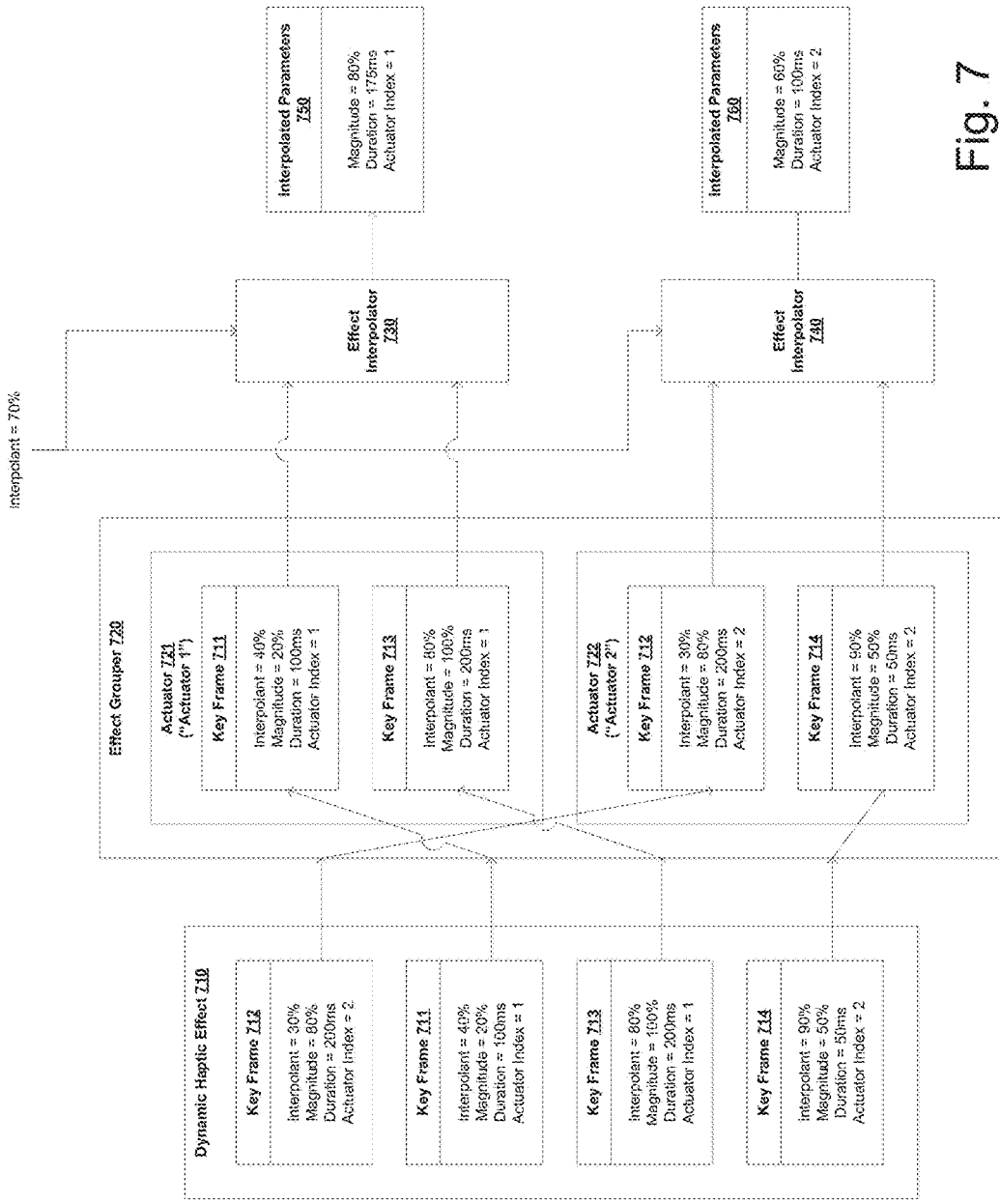
FIG. 7 illustrates a block diagram of an example implementation of generating a dynamic haptic effect at multiple actuators, according to another embodiment of the invention.

FIG. 7 illustrates a block diagram of an example implementation of generating a dynamic haptic effect at multiple actuators, according to another embodiment of the invention. According to the embodiment, a dynamic haptic effect can include one or more key frames, and each key frame can include an actuator value that identifies an actuator. The actuator identified by the actuator value is an actuator that the key frame targets. A system can then group the one or key frames by each actuator identified by each actuator value. More specifically, the system can create one or more groups of key frames, where each key frame of a group targets the same actuator. For each actuator, the system can independently interpolate each haptic effect stored in the one or more key frames of the group associated with the actuator, in order to generate the dynamic haptic effect.

For example, as illustrated in FIG. 7, dynamic haptic effect 710 includes key frames 711, 712, 713, and 714. Key frame 711 includes an interpolant value of "40%," a magnitude value of "20%," a duration value of "100 ms," and an actuator value (identified in FIG. 7 as an "actuator index") of "1." The magnitude value of "20%," and the duration value of "100 ms," collectively represents a basis haptic effect that is stored within key frame 711. Of course, the illustrated embodiment is only an example embodiment, and, in alternate embodiments, a basis haptic effect can include other parameters (such as a frequency parameter and a period parameter) that are stored within a key frame. Key frame 712 includes an interpolant value of "30%," a magnitude value of "80%," a duration value of "200 ms," and an actuator value of "2." The magnitude value of "80%," and the duration value of "200 ms," collectively represents a basis haptic effect that is stored within key frame 712. Key frame 713 includes an interpolant value of "80%," a magnitude value of "100%," a duration value of "200 ms," and an actuator value of "1." The magnitude value of "100%," and the duration value of "200 ms," collectively represents a basis haptic effect that is stored within key frame 713. Key frame 714 includes an interpolant value of "90%," a magnitude value of "50%," a duration value of "50 ms," and an actuator value of "2." The magnitude value of "50%," and the duration value of "50 ms," collectively represents a basis haptic effect that is stored within key frame 714.

According to the embodiment, at effect grouper 720, the system can group together key frames 711 and 713 based on the actuator value of "1" stored within key frames 711 and 713, and associate the group with actuator 721 (i.e., actuator 1). Further, at effect grouper 720, the system can group together key frames 712 and 714 based on the actuator value of "2" stored within key frames 712 and 714, and associate the group with actuator 722 (i.e., actuator 2).

Further, according to the embodiment, the system can receive an interpolant value of "70%" at effect interpolator 730, and interpolate the basis haptic effect of key frame 711 (i.e., the magnitude value of "20%," and the duration value of "100 ms,") with the basis haptic effect of key frame 713 (i.e., the magnitude value of "100%," and the duration value of "200 ms"). The result of this interpolation is interpolated parameters 750, where interpolated parameters 750 represent a portion of dynamic haptic effect 710 that can be output at actuator 721. According to the illustrated embodiment, interpolated parameters 750 include an interpolated magnitude value of "80%," and an interpolated duration value of "175 ms". According to the embodiment, the interpolated magnitude value of "80%," is interpolated from the two magnitude values of "20%" and "100%," based on an interpolation function. Further, the interpolated duration value of "175 ms" is interpolated from the two duration values of "100 ms" and "200 ms," also based on an interpolation function.

Also according to the embodiment, the system can independently receive an interpolant value of "70%" at effect interpolator 740, and independently interpolate the basis haptic effect of key frame 712 (i.e., the magnitude value of "80%," and the duration value of "200 ms,") with the basis haptic effect of key frame 714 (i.e., the magnitude value of "50%," and the duration value of "50 ms"). The result of this interpolation is interpolated parameters 760, where interpolated parameters 760 represent a portion of dynamic haptic effect 710 that can be output at actuator 722. According to the illustrated embodiment, interpolated parameters 760 include an interpolated magnitude value of "60%," and an interpolated duration value of "100 ms". According to the embodiment, the interpolated magnitude value of "60%," is interpolated from the two magnitude values of "80%" and "50%," based on an interpolation function. Further, the interpolated duration value of "100 ms" is interpolated from the two duration values of "200 ms" and "50 ms," also based on an interpolation function. While the illustrated embodiment involves four key frames, and involves two actuators, one of ordinary skill in the art would readily appreciate that, in alternate embodiments, the above implementation can involve any number of key frames, and can include any number of actuators.

According to the embodiment, while the interpolation of the basis haptic effects of key frames 711 and 713, and the interpolation of the basis haptic effect of key frames 712 and 714, are performed independently, the independent interpolations can also be synchronized to output dynamic haptic effect 710 at actuators 721 and 722. Thus, actuators 721 and 722 can each output a respective portion of dynamic haptic effect 710 in a synchronized manner. In the illustrated embodiment, the same interpolant value is provided to effect interpolators 730 and 740. However, in alternate embodiments, effect interpolators 730 and 740 can each be provided a different interpolant value.

Figure 8:
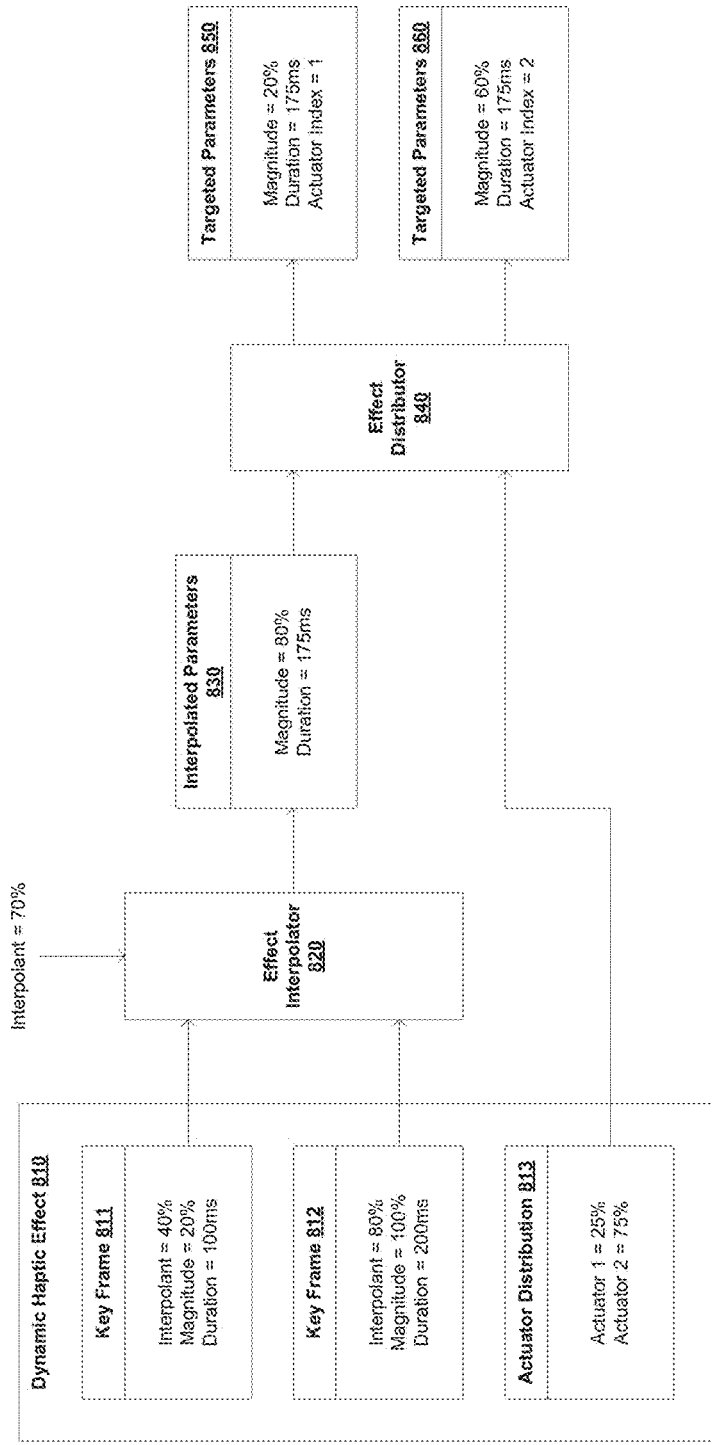
FIG. 8 illustrates a block diagram of an example implementation of generating a dynamic haptic effect at multiple actuators, according to another embodiment of the invention.

FIG. 8 illustrates a block diagram of an example implementation of generating a dynamic haptic effect at multiple actuators, according to another embodiment of the invention. According to the embodiment, a dynamic haptic effect can include one or more key frames. When a system interpolates each haptic effect stored in two or more key frames to generate the dynamic haptic effect, the system can also determine actuator distribution information that indicates how to distribute the dynamic haptic effect among a plurality of actuators. The system can then interpolate each haptic effect stored in the two or more key frames to generate the dynamic haptic effect, and can then use the actuator distribution information to distribute the generated dynamic haptic effect among the plurality of actuators.

For example, as illustrated in FIG. 8, dynamic haptic effect 810 includes key frames 811 and 812. Key frame 811 includes an interpolant value of "40%," a magnitude value of "20%," and a duration value of "100 ms." According to the embodiment, the magnitude value of "20%," and the duration value of "100 ms," collectively represents a basis haptic effect that is stored within key frame 811. Of course, the illustrated embodiment is only an example embodiment, and, in alternate embodiments, a basis haptic effect can include other parameters (such as a frequency parameter and a period parameter) that are stored within a key frame. Key frame 812 includes an interpolant value of "80%," a magnitude value of "100%," and a duration value of "200 ms". According to the embodiment, the magnitude value of "100%," and the duration value of "200 ms," collectively represents a basis haptic effect that is stored within key frame 812. Dynamic haptic effect 810 further includes actuator distribution information 813 (identified in FIG. 8 as "actuator distribution 813"). Actuator distribution information 813 indicates how to distribute dynamic haptic effect 810 among a plurality of actuators. In the illustrated embodiment, distribution information 813 indicates that 25% of dynamic haptic effect 810 is to be distributed to a first actuator (i.e., Actuator 1), and that 75% of dynamic haptic effect 810 is to be distributed to a second actuator (i.e., Actuator 2).

According to the embodiment, the system can receive an interpolant value of "70%" at effect interpolator 820, and interpolate the basis haptic effect of key frame 811 (i.e., the magnitude value of "20%," and the duration value of "100 ms,") with the basis haptic effect of key frame 812 (i.e., the magnitude value of "100%," and the duration value of "100 ms"). The result of this interpolation is interpolated parameters 830, where interpolated parameters 830 represent dynamic haptic effect 810. According to the illustrated embodiment, interpolated parameters 830 include an interpolated magnitude value of "80%," and an interpolated duration value of "175 ms". According to the embodiment, the interpolated magnitude value of "80%," is interpolated from the two magnitude values of "20%" and "100%," based on an interpolation function. Further, the interpolated duration value of "175 ms" is interpolated from the two duration values of "100 ms" and "200 ms," also based on an interpolation function.

Further, according to the embodiment, at effect distributor 840, the system can distribute interpolated parameters 830, which represent dynamic haptic effect 810, among a plurality of actuators based on actuator distribution information 813, where the system generates targeted parameters for each actuator of the plurality of actuators based on actuator distribution information 813. The targeted parameters for each actuator represent a portion of dynamic haptic effect 810 that is distributed to the actuator. In the illustrated embodiment, at effect distributor 840, the system generates targeted parameters 850 and targeted parameters 860. Targeted parameters 850 include a magnitude value of "20%," a duration value of "175 ms," and an actuator value (identified in FIG. 8 as an "actuator index") of "1." Targeted parameters 660 include a magnitude value of "60%," a duration value of "175 ms," and an actuator value of "2." According to the embodiment, the system can use actuator distribution information 813 to distribute 25% of dynamic haptic effect 810 to actuator "1," and to distribute 75% of dynamic haptic effect 810 to actuator "2." In one embodiment, the strength parameters of dynamic haptic effect 810, such as a magnitude parameter and a period parameter, are distributed among the plurality of actuators. According to the embodiment, the time-based parameters, such as a frequency parameter and a duration parameter, remain the same for the plurality of actuators.

Thus, in the illustrated embodiment, the interpolated magnitude value "80%" of interpolated parameters 830 is distributed into a magnitude value of "20%" for targeted parameters 850, and a magnitude value of "60%" for targeted parameters 860. Further, in the illustrated embodiment, the interpolated duration value "175 ms" of interpolated parameters 830 is included in both targeted parameters 850 and targeted parameters 860. While the illustrated embodiment involves two key frames, and involves two actuators, one of ordinary skill in the art would readily appreciate that, in alternate embodiments, the above implementation can involve any number of key frames, and can include any number of actuators.

In one embodiment, actuator distribution information 813 can be stored within a haptic effect file that dynamic haptic effect 810 is stored within. In another embodiment, actuator distribution information 813 can stored within one or more key frames of dynamic haptic effect 810. In yet another embodiment, actuator distribution information 813 can be stored within a basis haptic effect that is referenced by one or more of the key frames of dynamic haptic effect 810. In yet another embodiment, actuator distribution information 813 can be determined by the system at run time.

In one embodiment, even if one or more key frames of dynamic haptic effect 810 includes an actuator value, the system can disregard the one or more actuator values stored within the one or more key frames of dynamic haptic effect 810, and can distribute dynamic haptic effect 810 among a plurality of actuators based on actuator distribution information 813.

Figure 9:
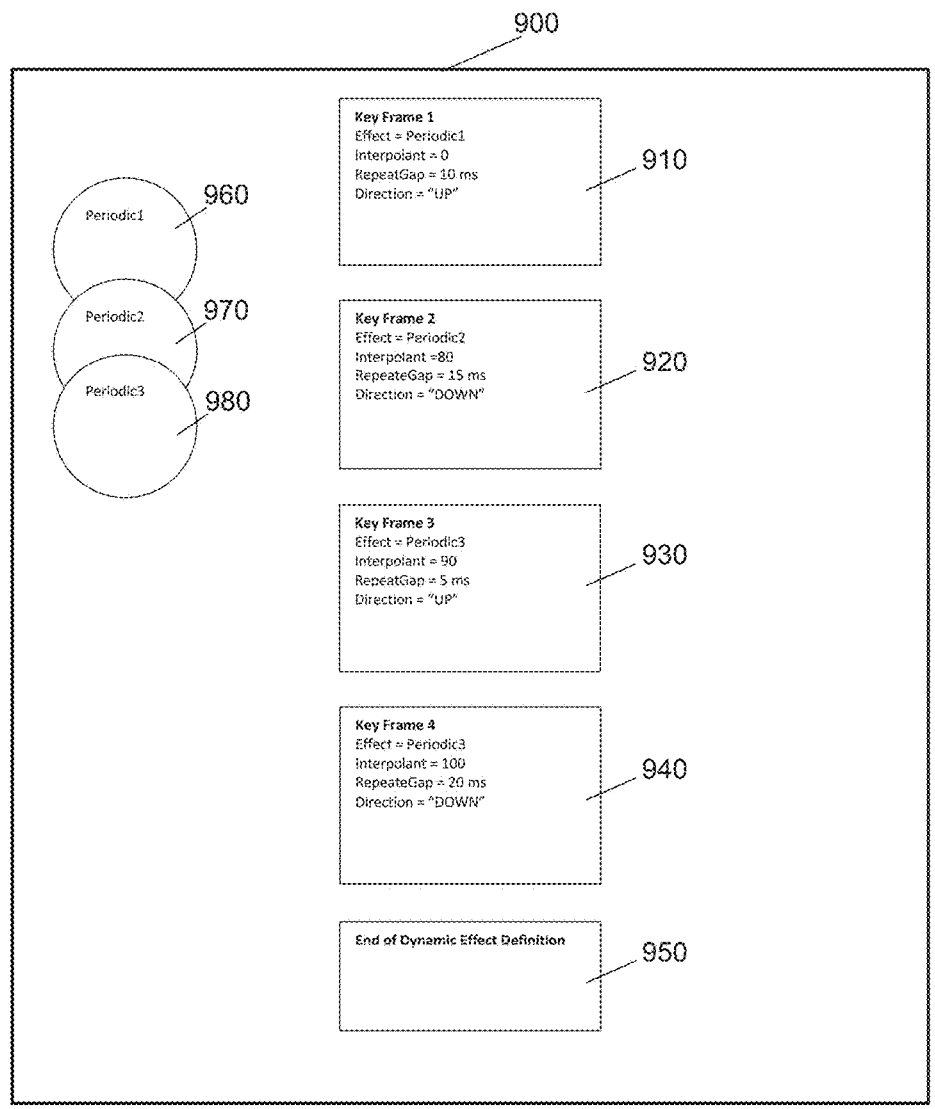
FIG. 9 illustrates an example key frame definition that includes a direction property, according to an embodiment of the invention.

FIG. 9 illustrates an example key frame definition 900 that includes a direction property, according to an embodiment of the invention. According to an embodiment, as previously described, a dynamic haptic effect can be defined to include one or more key frames. As also previously described, a key frame can include a basis haptic effect definition, an interpolant value, and optionally, a repeat gap value.

According to the embodiment, a key frame can also include a direction value. A direction value is a value that specifies a direction of a dynamic haptic effect. A direction of a dynamic haptic effect is an ordinal direction of a received interpolant value for the dynamic haptic effect, as compared to a previously received interpolant value for the dynamic haptic effect. For example, if a received interpolant value for a dynamic haptic effect is the value "100," and the previously received interpolant value for the dynamic haptic effect is "50," a direction of the dynamic haptic effect can be classified as "upwards," because the received interpolant value is greater than the previously received interpolant value. Thus, as an example, a direction value of "UP," can specified the "upwards" direction of the dynamic haptic effect. As another example, if a received interpolant value for a dynamic haptic effect is the value "100," and the previously received interpolant value for the dynamic haptic effect is "200," a direction of the dynamic haptic effect can be classified as "downwards," because the received interpolant value is less than the previously received interpolant value. Thus, as an example, a direction value of "DOWN," can specified the "downwards" direction of the dynamic haptic effect. In an embodiment, a direction value can be a string value. In another embodiment, a direction value can be a fixed-point or floating-point numeric value. A direction value can be stored within one or more bits.

Also according to the embodiment, a key frame can optionally also include a category value. A category value is a value that specifies a category of a dynamic haptic effect. A category of a dynamic haptic effect is a classification of the dynamic haptic effect. In one embodiment, a category of a dynamic haptic effect can be determined by a category value that can be received along with an interpolant value. In another embodiment, a category of the dynamic haptic effect can be determined based on a received interpolant value. In an embodiment, a category value can be a string value. In another embodiment, a category value can be a fixed-point or floating-point numeric value. A category value can be stored within one or more bits.

In the illustrated embodiment, dynamic haptic effect definition 900 includes four key frames, key frames 910, 920, 930, and 940. However, this is merely an example embodiment, and in alternate embodiments, a dynamic haptic effect definition can include any number of key frames. Key frame 910 includes a basis haptic effect reference of "Periodic1," an interpolant value of "0," and a repeat gap value of "10 ms". The basis haptic effect reference "Periodic1" refers to basis haptic effect 960, which is also included within dynamic haptic effect definition 900. Thus, key frame 910 defines basis haptic effect 960 as the basis haptic effect for the interpolant value of "0." Key frame 910 further indicates that when basis haptic effect 960 is played consecutively, there is a time period of 10 ms between each consecutive instance of basis haptic effect 960. Similarly, key frame 920 includes a basis haptic effect reference of "Periodic2," an interpolant value of "80," and a repeat gap value of "15 ms." The basis haptic effect reference "Periodic2" refers to basis haptic effect 970, which is also included within dynamic haptic effect definition 900. Thus, key frame 920 defines basis haptic effect 970 as the basis haptic effect for the interpolant value of "80." Key frame 920 further indicates that when basis haptic effect 970 is played consecutively, there is a time period of 15 ms between each consecutive instance of basis haptic effect 970.

Likewise, key frame 930 includes a basis haptic effect reference of "Periodic3," an interpolant value of "90," and a repeat gap value of "5 ms." The basis haptic effect reference "Periodic3" refers to basis haptic effect 980, which is also included within dynamic haptic effect definition 900. Thus, key frame 930 defines basis haptic effect 980 as the basis haptic effect for the interpolant value of "90." Key frame 930 further indicates that when basis haptic effect 980 is played consecutively, there is a time period of 5 ms between each consecutive instance of basis haptic effect 980. Similarly, key frame 940 includes a basis haptic effect reference of "Periodic3," an interpolant value of "100," and a repeat gap value of "20 ms". As previously described, the basis haptic effect reference "Periodic3" refers to basis haptic effect 980, which is also included within dynamic haptic effect definition 200. Thus, key frame 940 defines basis haptic effect 980 as the basis haptic effect for the interpolant value of "100." Key frame 940 further indicates that when basis haptic effect 980 is played consecutively, there is a time period of 20 ms between each consecutive instance of basis haptic effect 980.

According to the illustrated embodiment, key frames 910, 920, 930, and 940 each also include a direction value. More specifically, key frames 910 and 930 each include a direction value of "UP," and key frames 920 and 940 each include a direction value of "DOWN." Thus, key frames 910 and 930 indicate that they are key frames to be used (and thus, their respective basis haptic effects are to be used) when a direction of dynamic haptic effect definition 900 is an "upwards" direction. Further, key frames 920 and 940 indicate that they are key frames to be used (and thus, their respective basis haptic effects are to be used) when a direction of dynamic haptic effect definition 900 is a "downwards" direction. In an alternate embodiment, key frames 910, 920, 930, and 940 can each optionally also include a category value (not illustrated in FIG. 9). In this alternate embodiment, key frames 910, 920, 930, and 940 further indicate that each respective key frame (and thus, each respective basis haptic effect) is to be used when a category of dynamic haptic effect definition 900 is a category that is equal to the category value of the respective key frame According to an embodiment, a dynamic haptic effect can be defined to also include an indication of an end of the dynamic haptic effect. The indication of the end of the dynamic haptic effect indicates that the dynamic haptic effect does not include any additional key frames. As previously described, a device that interprets a dynamic haptic effect definition can be configured to interpret the contents of the dynamic haptic effect definition sequentially. Thus, the indication can indicate to a device the end of the dynamic haptic effect definition. In one embodiment, the indication of an end of the dynamic haptic effect can be considered an additional key frame. In the illustrated embodiment, dynamic haptic effect definition 900 includes end of dynamic haptic effect definition 950 which indicates the end of dynamic haptic effect definition 900.

In one example embodiment, a dynamic haptic effect can be designed for a user interface software module that displays a glow along an edge of a user interface of a device. The dynamic haptic effect can include a plurality of key frames, where each key frame includes an interpolant value. According to the embodiment, there may be many more interpolant values associated with decreasing the glow along the edge of the user interface, in comparison with the interpolant values associated with increasing the glow. By storing a direction value within each key frame, where each direction value either includes a value of "GROW" or "DECAY," each key frame (and thus, each interpolant value of the value) can be associated with a specific direction of the dynamic haptic effect (i.e., a "growing" direction of the dynamic haptic effect, or a "decaying" direction of the dynamic haptic effect).

Figure 10:
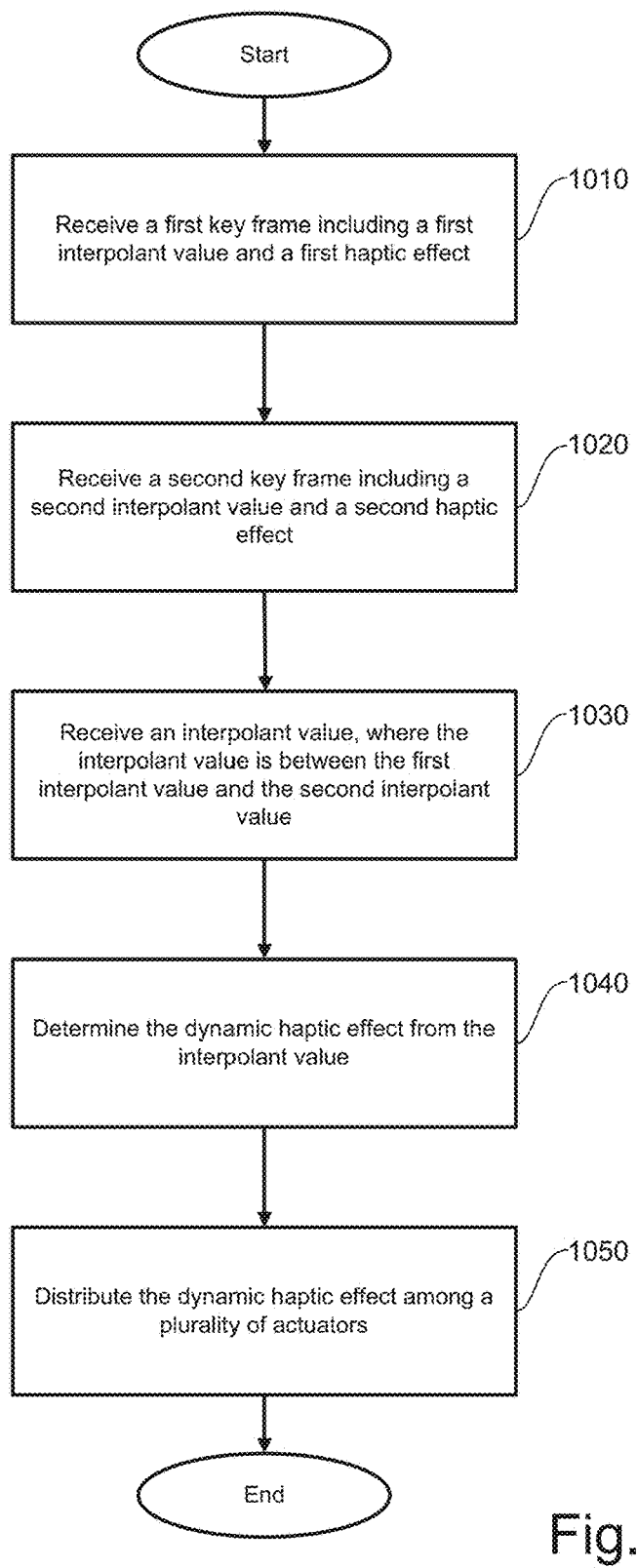
FIG. 10 illustrates a flow diagram of the functionality of a haptic effect generation module, according to one embodiment of the invention.
Figure 11:
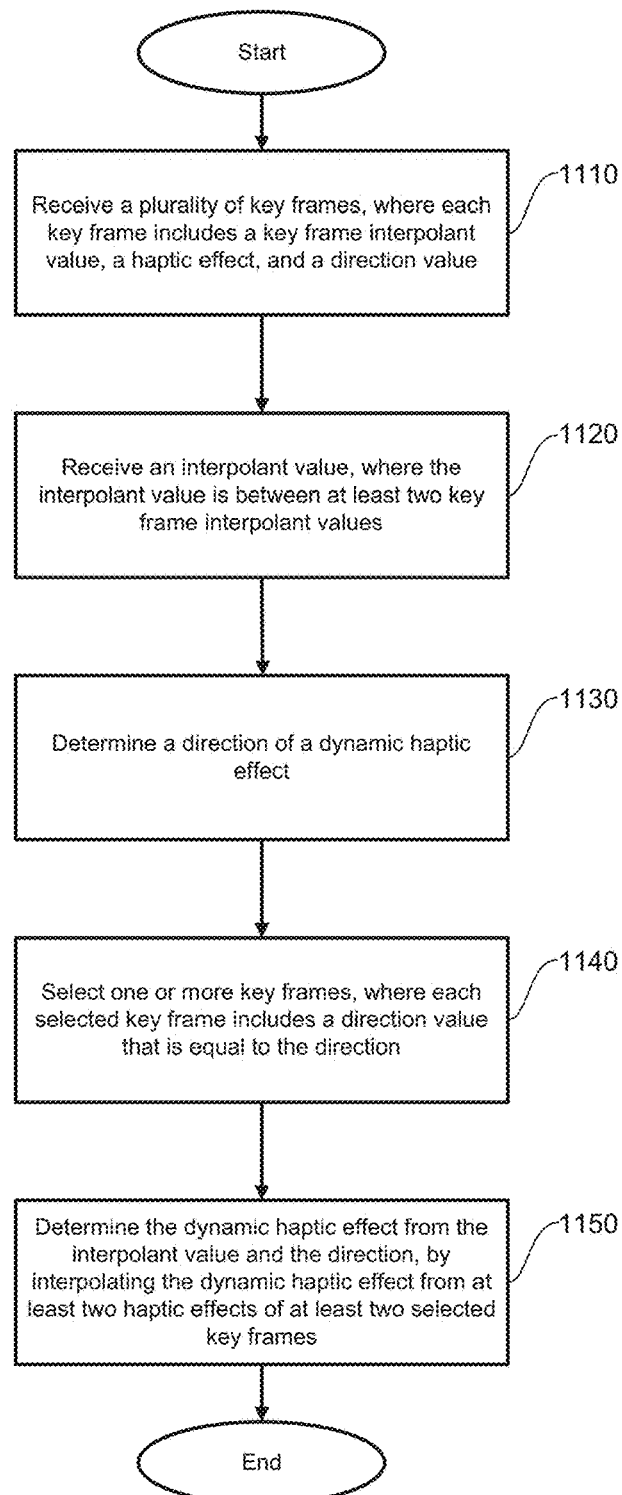
FIG. 11 illustrates a flow diagram of the functionality of a haptic effect generation module, according to another embodiment of the invention.

FIG. 10 illustrates a flow diagram of the functionality of a haptic effect generation module (such as haptic effect generation module 16 of FIG. 1), according to one embodiment of the invention. In one embodiment, the functionality of FIG. 10, as well as the functionality of FIG. 11, are each implemented by software stored in memory or another computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. Furthermore, in alternate embodiments, each functionality may be performed by hardware using analog components.

The flow begins and proceeds to 1010. At 1010, a first key frame is received, where the first key frame includes a first interpolant value and a first haptic effect. The first interpolant value can be a value that specifies where an interpolation occurs for the first haptic effect. The first key frame can include a repeat gap value. The first haptic effect can be a vibratory haptic effect, and can include a plurality of parameters. The plurality of parameters can include a magnitude parameter, a frequency parameter, a period parameter, and a duration parameter. The flow then proceeds to 1020.

At 1020, a second key frame is received, where the second key frame includes a second interpolant value and a second haptic effect. The second interpolant value can be a value that specifies where an interpolation occurs for the second haptic effect. The second key frame can include a repeat gap value. The second haptic effect can be a vibratory haptic effect, and can include a plurality of parameters. The plurality of parameters can include a magnitude parameter, a frequency parameter, a period parameter, and a duration parameter. In the illustrated embodiment, a dynamic haptic effect can be defined as including two key frames, where each key frame includes a haptic effect. However, a dynamic haptic effect can alternately be defined as including three or more key frames, where each key frame includes a haptic effect. The flow then proceeds to 1030.

At 1030, an interpolant value is received, where the interpolant value is between the first interpolant value and the second interpolant value. The flow then proceeds to 1040. At 1040, a dynamic haptic effect is determined from the interpolant value. The determining of the dynamic haptic effect is further described in greater detail according to different embodiments. The flow then proceeds to 1050. At 1050, the dynamic haptic effect is distributed among a plurality of actuators. The distributing of the dynamic haptic effect is also further described in greater detail according to different embodiments. The flow then ends.

In one embodiment, the determining of the dynamic haptic effect can be performed according to the following functionality. The dynamic haptic effect can be interpolated from the first haptic effect and the second haptic effect. According to the embodiment, a value for each parameter of the dynamic haptic effect can be calculated by interpolating a value of the parameter of the first haptic effect with a value of the parameter of the second haptic effect, using an interpolation function. The interpolation of each parameter value of the dynamic haptic effect can be based upon where the received interpolant value falls between the first interpolant value that corresponds to the first haptic effect and the second interpolant value that corresponds to the second haptic effect. In the illustrated embodiment, a dynamic haptic effect can be generated by interpolating two basis haptic effects. Such an interpolation can be a linear interpolation. However, a dynamic haptic effect can alternately be generated by interpolating three or more haptic effects based on the abovementioned functionality. Such an interpolation can be a spline interpolation, where a spline interpolation is a form of interpolation where an interpolating function is a special type of piecewise polynomial called a spline, and where the interpolating function is a function that can map an interpolant value to a dynamic haptic effect using two or more key frames.

Further, according to the embodiment, the distributing the dynamic haptic effect can be based on the following functionality. A first actuator value can be received. The first actuator value can correspond to a first actuator of the plurality of actuators, and the first actuator value can be stored within the first key frame. A second actuator value can also be received. The second actuator value can correspond to a second actuator of the plurality of actuators, and the second actuator value can be stored within the second key frame. In alternate embodiments, one or more additional actuator values can be received. An interpolated actuator value can be interpolated from the first actuator value and the second actuator value. According to the embodiment, the interpolated actuator value can be calculated by interpolating the first actuator value with the second actuator value, using an interpolation function. However, an interpolated actuator value can alternately be generated by interpolating three or more actuator values based on the abovementioned functionality. The dynamic haptic effect can then be distributed among the first actuator and the second actuator based on the interpolated actuator value. However, a dynamic haptic effect can alternately be distributed among three or more actuators based on the aforementioned functionality.

In another embodiment, a third key frame and fourth key frame are received, where the third key frame includes a third interpolant value and a third haptic effect, and the fourth key frame includes a fourth interpolant value and fourth haptic effect. In this embodiment, the distributing the dynamic haptic effect can be based on the following functionality. A first actuator value can be received. The first actuator value can correspond to a first actuator of the plurality of actuators, and the first actuator value can be stored within the first key frame and the third key frame. A second actuator value can be received. The second actuator value can correspond to a second actuator of the plurality of actuators, and the second actuator value can be stored within the second key frame and the fourth key frame. The first key frame and the third key frame can be grouped together. The second key frame and the fourth key frame can be grouped together. However, a dynamic haptic effect can alternately be distributed among three or more actuators based on the aforementioned functionality.

Further, according to the embodiment, the determining of the dynamic haptic effect can be performed according to the following functionality. A first dynamic haptic effect for the first actuator can be interpolated from the first haptic effect and the third haptic effect. A second dynamic haptic effect for the second actuator can be interpolated from the second haptic effect and the fourth haptic effect. However, each dynamic haptic effect can alternately be generated by interpolating three or more haptic effects based on the abovementioned functionality.

In another embodiment, the determining of the dynamic haptic effect can be performed according to the following functionality. The dynamic haptic effect can be interpolated from the first haptic effect and the second haptic effect, as previously described. However, a dynamic haptic effect can alternately be generated by interpolating three or more haptic effects based on the abovementioned functionality.

Further, according to the embodiment, the determining of the dynamic haptic effect can be performed according to the following functionality. Actuator distribution information can be received, where the actuator distribution information indicates how to distribute the dynamic haptic effect among the plurality of actuators. The dynamic haptic effect can then be distributed among the plurality of actuators based on the actuator distribution information. In one embodiment, the actuator distribution information can be stored within a haptic effect file that the dynamic haptic effect is stored within. In another embodiment, the actuator distribution information can stored within one or more key frames of the dynamic haptic effect. In yet another embodiment, the actuator distribution information can be stored within a haptic effect that is referenced by one or more of the key frames of the dynamic haptic effect. In yet another embodiment, the actuator distribution information can be determined at run time.

FIG. 11 illustrates a flow diagram of the functionality of a haptic effect generation module (such as haptic effect generation module 16 of FIG. 1), according to another embodiment of the invention. The flow begins and proceeds to 1110. At 1110, a plurality of key frames is received. Each key frame includes a key frame interpolant value, a haptic effect, and a direction value. The flow then proceeds to 1120. At 1120, an interpolant value is received. The interpolant value is between at least two key frame interpolant values. The flow then proceeds to 1130. At 1130, a direction is determined for a dynamic haptic effect. The flow then proceeds to 1140. At 1140, one or more key frames are selected from the plurality of key frames. Each selected key frame includes a direction value that is equal to the direction. The flow then proceeds to 1150. At 1150, the dynamic haptic effect is determined from the interpolant value and the direction. According to the embodiment, the determining can include interpolating the dynamic haptic effect from at least two haptic effects of at least two selected key frames. The flow then ends.

In an alternate embodiment, each key frame can also include a category value. A category can be determined for the dynamic haptic effect. One or more key frames can be further selected from the selected one or more key frames. Each further selected key frame can include a category value that is equal to the category. The dynamic haptic effect can be determined from the interpolant value, the direction, and the category. According to the alternate embodiment, the determining can include interpolating the dynamic haptic effect from at least two haptic effects of at least two further selected key frames.

Thus, according to an embodiment, a system can be provided that generates one or more dynamic haptic effects at a plurality of actuators, where the one or more dynamic haptic effects can be distributed among the plurality of actuators. Thus, the system can animate spatial characteristics of the dynamic haptic effect by moving the dynamic haptic effect among different actuators. This can allow the system to add a spatial location as a parameter of a dynamic haptic effect, and can provide for a more robust haptic experience. Further, according to another embodiment, a system can be provided that generates a dynamic haptic effect using one or more key frames, where each key frame includes a direction property. This can allow a dynamic haptic effect to be modified differently depending on the direction, and thus, can further enhance a haptic experience.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to generate a dynamic haptic effect, the generating the dynamic haptic effect comprising:
receiving a first key frame that includes a first interpolant value, a first haptic effect, and a first actuator value that identifies a first actuator;
receiving a second key frame that includes a second interpolant value, a second haptic effect, and a second actuator value that identifies a second actuator;
receiving an input interpolant value;
determining the dynamic haptic effect based on the input interpolant value; and
causing the first actuator and the second actuator to synchronously output a respective portion of the dynamic haptic effect.

2. The non-transitory computer-readable medium of claim 1, wherein at least one of the first key frame or the second key frame further includes a direction value that specifies a direction of the dynamic haptic effect.

3. The non-transitory computer-readable medium of claim 1, wherein the input interpolant value is between the first interpolant value and the second interpolant value.

4. The non-transitory computer-readable medium of claim 1, wherein a grouping of key frames includes the first key frame or the second key frame according to an actuator value.

5. The non-transitory computer-readable medium of claim 1, wherein the dynamic haptic effect is a vibratory haptic effect and comprises a plurality of parameters.

6. The non-transitory computer-readable medium of claim 5, wherein the plurality of parameters include a duration parameter, a magnitude parameter, a period parameter, and a frequency parameter.

7. The non-transitory computer-readable medium of claim 1, wherein different input interpolant values are provided according to an actuator value.

8. A computer-implemented method for generating a dynamic haptic effect, the computer-implemented method comprising:
   receiving a first key frame that includes a first interpolant value, a first haptic effect, and a first actuator value that identifies a first actuator;
   receiving a second key frame that includes a second interpolant value, a second haptic effect, and a second actuator value that identifies a second actuator;
   receiving an input interpolant value;
   determining the dynamic haptic effect based on the input interpolant value; and
   causing the first actuator and the second actuator to synchronously output a respective portion of the dynamic haptic effect.

9. The computer-implemented method of claim 8, wherein at least one of the first key frame or the second key frame further includes a direction value that specifies a direction of the dynamic haptic effect.

10. The computer-implemented method of claim 8, wherein the input interpolant value is between the first interpolant value and the second interpolant value.

11. The computer-implemented method of claim 8, wherein a grouping of key frames includes the first key frame or the second key frame according to an actuator value.

12. The computer-implemented method of claim 8, wherein the dynamic haptic effect is a vibratory haptic effect and comprises a plurality of parameters.

13. The computer-implemented method of claim 12, wherein the plurality of parameters include a duration parameter, a magnitude parameter, a period parameter, and a frequency parameter.

14. The computer-implemented method of claim 8, wherein different input interpolant values are provided according to an actuator value.

15. A system for generating a dynamic haptic effect, the system comprising:
   a first actuator;
   a second actuator;
   a processor; and
   a memory storing one or more programs for execution by the processor, the one or more programs including instructions for:
      receiving a first key frame that includes a first interpolant value, a first haptic effect, and a first actuator value that identifies the first actuator;
      receiving a second key frame that includes a second interpolant value, a second haptic effect, and a second actuator value that identifies the second actuator;
      receiving an input interpolant value;
      determining the dynamic haptic effect based on the input interpolant value; and
      causing the first actuator and the second actuator to synchronously output a respective portion of the dynamic haptic effect.

16. The system of claim 15, wherein at least one of the first key frame or the second key frame further includes a direction value that specifies a direction o the dynamic haptic effect.

17. The system of claim 15, wherein the input interpolant value is between the first interpolant value and the second interpolant value.

18. The system of claim 15, wherein a grouping of key frames includes the first key frame or the second key frame according to an actuator value.

19. The system of claim 15, wherein the dynamic haptic effect is a vibratory haptic effect and comprises a plurality of parameters.

20. The system of claim 15, wherein different input interpolant values are provided according to an actuator value.

\* \* \* \* \*

UNITED STATES PATENT AND TRADEMARK OFFICE
CERTIFICATE OF CORRECTION

PATENT NO. : 10,359,851 B2
APPLICATION NO. : 15/791862
DATED : July 23, 2019
INVENTOR(S) : Henry Da Costa et al.

It is certified that error appears in the above-identified patent and that said Letters Patent is hereby corrected as shown below:

On the Title Page

Item (72), Inventors: after Eric Gervais, Montreal (CA) add --Satvir Singh Bhatia, Milpitas, CA (US)--

Signed and Sealed this
Tenth Day of September, 2019

Andrei Iancu
*Director of the United States Patent and Trademark Office*